US012712237B2

(12) United States Patent
Ko et al.

(10) Patent No.: US 12,712,237 B2
(45) Date of Patent: Aug. 18, 2026

(54) SECONDARY BATTERY INCLUDING A CAP ASSEMBLY HAVING A CAP-DOWN WELDED TO A SAFETY VENT

(71) Applicant: Samsung SDI Co., Ltd., Yongin-si (KR)

(72) Inventors: Sung Gwi Ko, Yongin-si (KR); Dae Kyu Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 936 days.

(21) Appl. No.: 17/597,469

(22) PCT Filed: Jun. 29, 2020

(86) PCT No.: PCT/KR2020/008482
§ 371 (c)(1),
(2) Date: Jan. 6, 2022

(87) PCT Pub. No.: WO2021/006516
PCT Pub. Date: Jan. 14, 2021

(65) Prior Publication Data
US 2022/0255183 A1 Aug. 11, 2022

(30) Foreign Application Priority Data
Jul. 8, 2019 (KR) ........................ 10-2019-0082213

(51) Int. Cl.
*H01M 2/12* (2006.01)
*H01M 10/0525* (2010.01)
(Continued)

(52) U.S. Cl.
CPC ... *H01M 50/3425* (2021.01); *H01M 10/0525* (2013.01); *H01M 50/152* (2021.01); *H01M 50/392* (2021.01); *H01M 2200/20* (2013.01)

(58) Field of Classification Search
CPC ........... H01M 50/3425; H01M 50/342; H01M 50/35; H01M 50/152; H01M 50/392; H01M 10/052; H01M 10/0525; H01M 2200/20
See application file for complete search history.

(56) References Cited

U.S. PATENT DOCUMENTS 8,357,462 B2 1/2013 Zhu et al.
10,290,903 B2 5/2019 Lee et al.
(Continued)

FOREIGN PATENT DOCUMENTS

CN 201408794 Y 2/2010
CN 205488250 U 8/2016
(Continued)

OTHER PUBLICATIONS

International Search Report, with English translation, dated Oct. 12, 2020, for PCT/KR2020/008482, 6 pages.
(Continued)

*Primary Examiner* — Raymond Alejandro
(74) *Attorney, Agent, or Firm* — Womble Bond Dickinson (US) LLP

(57) ABSTRACT

A secondary battery enabling the enhancement of safety by rapidly releasing gas generated therein. The secondary battery includes an electrode assembly; a case for receiving the electrode assembly; and a cap assembly coupled to the upper portion of the case and provided with a cap-up, a safety vent installed on the lower portion of the cap-up and having a notch formed therein, and a cap-down coupled to the lower portion of the safety vent. The cap-down includes a welded part welded to the safety vent from the lower portion of the cap-down.

10 Claims, 4 Drawing Sheets

(51) Int. Cl.

| | |
|---|---|
| ***H01M 50/152*** | (2021.01) |
| ***H01M 50/342*** | (2021.01) |
| ***H01M 50/392*** | (2021.01) |

(56) References Cited

U.S. PATENT DOCUMENTS

| | | | | |
|---|---|---|---|---|
| 10,490,792 | B2 | 11/2019 | Lee et al. | |
| 2006/0275657 | A1 | 12/2006 | Kozuki et al. | |
| 2011/0008654 | A1* | 1/2011 | Kim | H01M 50/3425 429/56 |
| 2012/0040215 | A1 | 2/2012 | Zhu et al. | |
| 2015/0303439 | A1* | 10/2015 | Bae | H01M 50/528 429/61 |
| 2016/0126598 | A1 | 5/2016 | Lee et al. | |
| 2018/0159100 | A1 | 6/2018 | Lee et al. | |

FOREIGN PATENT DOCUMENTS

| | | | |
|---|---|---|---|
| CN | 107667443 | A | 2/2018 |
| CN | 207676956 | U | 7/2018 |
| CN | 109103359 | A | 12/2018 |
| JP | 2002-198100 | A | 7/2002 |
| JP | 3649000 | B2 | 2/2005 |
| KR | 10-0612389 | B1 | 8/2006 |
| KR | 10-1619444 | B1 | 5/2016 |
| KR | 10-2018-0080847 | A | 7/2018 |
| KR | 10-1889592 | B1 | 8/2018 |
| KR | 10-1948620 | B1 | 2/2019 |
| WO | WO 2019/112160 | A1 | 6/2019 |

OTHER PUBLICATIONS

Chinese Office Action for CN Application No. 202080054468.2 dated Nov. 6, 2023, 6 pages.

European Search Report for EP Application No. 20837516.2 dated Jan. 5, 2024, 8 pages.

* cited by examiner

SECONDARY BATTERY INCLUDING A CAP ASSEMBLY HAVING A CAP-DOWN WELDED TO A SAFETY VENT

CROSS-REFERENCE TO RELATED APPLICATION(S)

This application is a U.S. National Phase Patent Application of International Application Number PCT/KR2020/008482, filed on Jun. 29, 2020, which claims priority of Korean Patent Application Number 10-2019-0082213, filed on Jul. 8, 2019, the entire content of each of which is incorporated herein by reference.

TECHNICAL FIELD

The present invention relates to a secondary battery.

BACKGROUND ART

A secondary battery is a chargeable and dischargeable battery, unlike a primary battery that is not chargeable. Low-capacity secondary batteries are used in portable small electronic devices such as smart phones, feature phones, notebook computers, digital cameras, and camcorders, and large-capacity secondary batteries are widely used for a power source and power storage for driving a motor, such as hybrid vehicles, electric vehicles, and the like. Such lithium ion secondary batteries may be classified into cylindrical, prismatic, and pouch-type secondary batteries.

Particularly, a cylindrical lithium ion secondary battery generally includes a cylindrical electrode assembly, a cylindrical case to which the electrode assembly is coupled, an electrolyte injected into the inside of the case to enable movement of lithium ions, and a cap assembly coupled to one side of the case to prevent the electrolyte from leaking and preventing the electrode assembly from being separated.

The above-described information disclosed in the technology that serves as the background of the present invention is only for improving understanding of the background of the present invention and thus may include information that does not constitute the related art.

DISCLOSURE OF THE INVENTION

Technical Problem

The present invention provides a secondary battery capable of improving safety by rapidly discharging a gas generated therein.

Technical Solution

The secondary battery according to the present invention may include: an electrode assembly; a case configured to accommodate the electrode assembly; and a cap assembly coupled to an upper portion of the case, the cap assembly comprising a cap-up, a safety vent installed on a lower portion of the cap-up and provided with a notch, and a cap-down coupled to a lower portion of the safety vent, wherein the cap-down may include a welded part welded to the safety vent at a lower portion of the cap-down.

The welded part may be provided in plurality, which have the same radius from a center of the cap assembly and are spaced apart from each other.

The welded part may have a circular shape formed continuously along an outer circumference of the cap-down.

The welded part may be formed outside the notch.

A gas discharge hole through which a gas generated in the case is discharged may be formed at a center of the cap-down.

An electrode tab electrically connected to the electrode assembly may be welded to the outside of the gas discharge hole.

The safety vent may include a vent extension part configured to surround an edge of the cap-up and extend to an upper side of the cap-up, and a vent welded part configured to weld the safety vent to the cap-up may be formed on the vent extension part.

The vent welded part may be provided in plurality, which have the same radius from a center of the cap assembly and are spaced apart from each other.

The vent welded part may have a circular shape formed continuously along an outer circumference of the vent extension part.

Even though the notch is broken by a gas generated in the case, the cap-up, the safety vent, and the cap-down may be electrically connected to each other.

Advantageous Effects

In the secondary battery according to the embodiment of the present invention, the number of components of the cap assembly may be reduced to reduce the costs, and when the internal gas is generated, the safety vent may quickly operate to quickly end the abnormal situation, thereby improving the safety.

In addition, in the secondary battery according to the embodiment of the present invention, the vent welded part may be formed between the safety vent and the cap-up, and the welded part may be formed between the cap-down and the safety vent to reduce the contact area between the cap-up and the safety vent and between the safety vent and the cap-down, thereby reducing the internal resistance and the heat generation.

BRIEF DESCRIPTION OF THE DRAWINGS

FIG. **4*a* is a plan view of the cap assembly according to an embodiment of the present invention.

FIG. **5*a* is a plan view of a cap assembly according to another embodiment of the present invention.

MODE FOR CARRYING OUT THE INVENTION

Figure 1:
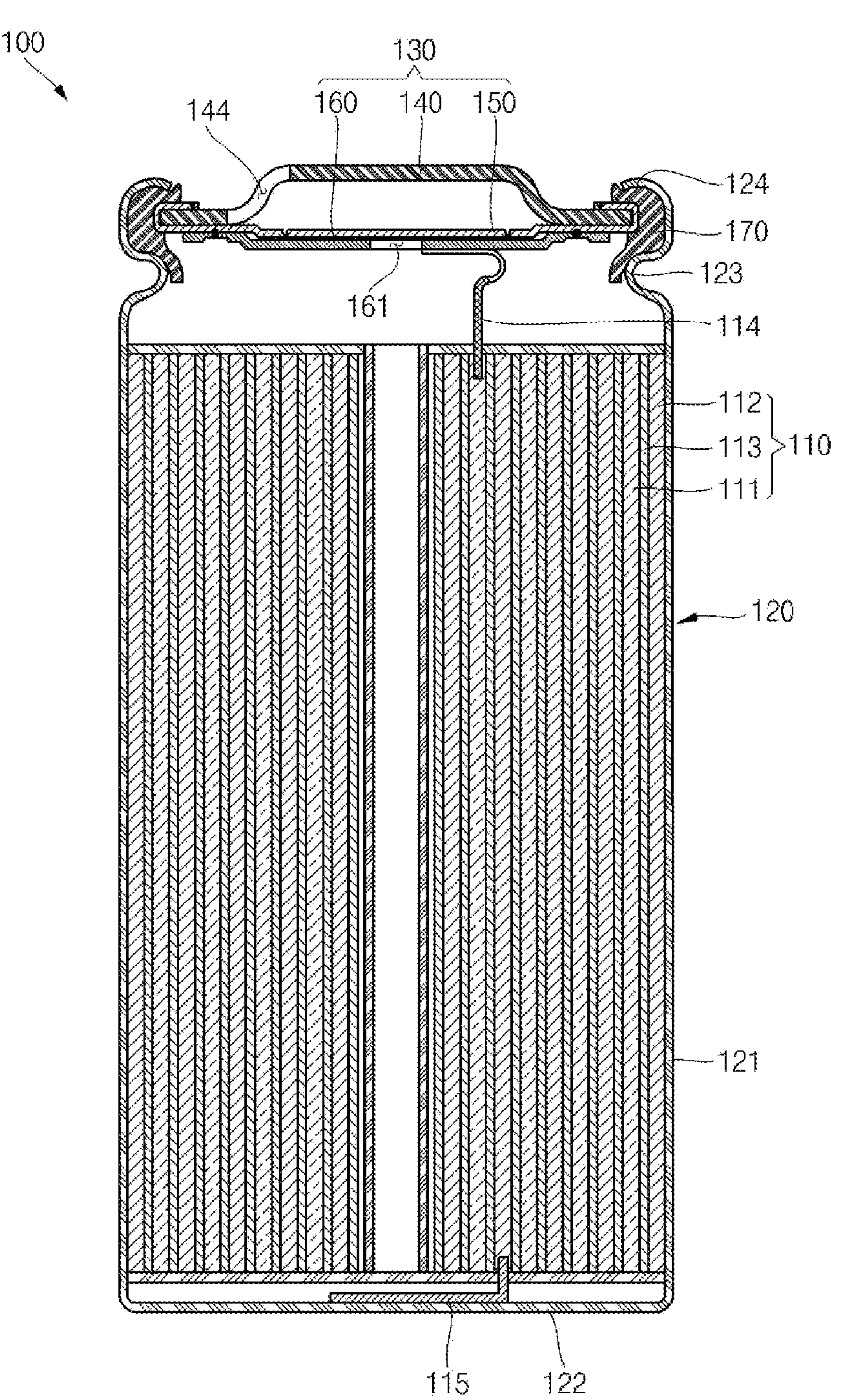
FIG. 1 is a cross-sectional view of a secondary battery according to an embodiment of the present invention.

Hereinafter, preferred embodiments will be described in detail with reference to the accompanying drawings.

The present invention may, however, be embodied in many different forms and should not be construed as being limited to the embodiments set forth herein; rather, these embodiments are provided so that those skilled in the art thoroughly understand the present invention. Rather, these embodiments are provided so that this disclosure will be thorough and complete, and will fully convey the scope of the present invention to those skilled in the art.

Also, in the drawing figures, the dimensions of layers and regions may be exaggerated for clarity of illustration. Like reference numerals refer to like elements throughout. As used herein, the term "and/or" includes any and all combinations of one or more of the associated listed items. In this specification, it will also be understood that when a member A is referred to as being connected to a member B, the member A can be directly connected to the member B or indirectly connected to the member B with a member B therebetween.

The terms used herein are for illustrative purposes of the present invention only and should not be construed to limit the meaning or the scope of the present invention. As used in this specification, a singular form may, unless definitely indicating a particular case in terms of the context, include a plural form. Also, the expressions "comprise" and/or "comprising" used in this specification neither define the mentioned shapes, numbers, processes, operations, members, elements, and/or groups of these, nor exclude the presence or addition of one or more other different shapes, numbers, processes, operations, members, elements, and/or groups of these, or addition of these. The term "and/or" used herein includes any and all combinations of one or more of the associated listed items.

As used herein, terms such as "first," "second," etc. are used to describe various members, components, regions, layers, and/or portions. However, it is obvious that the members, components, regions, layers, and/or portions should not be defined by these terms. The terms do not mean a particular order, up and down, or superiority, and are used only for distinguishing one member, component, region, layer, or portion from another member, component, region, layer, or portion. Thus, a first member, component, region, layer, or portion which will be described may also refer to a second member, component, region, layer, or portion, without departing from the teaching of the present invention.

Spatially relative terms, such as "below", "beneath", "lower", "above", "upper" and the like, used herein for ease of description to describe one element or feature's relationship to another element(s) or feature(s) as illustrated in the figures. These spatially relative terms are intended for easy comprehension of the prevent invention according to various process states or usage states of the prevent invention, and thus, the present invention is not limited thereto. For example, an element or feature shown in the drawings is turned inside out, the element or feature described as "beneath" or "below" may change into "above" or "upper". Thus, the term "below" may encompass the term "above" or "below".

FIG. 1 is a cross-sectional view of a secondary battery according to an embodiment of the present invention.

Referring to FIG. 1, a secondary battery 100 according to an embodiment of the present invention includes an electrode assembly 110, a case 120, a cap assembly 130, and a gasket 170.

The electrode assembly 110 includes a first electrode 111, a second electrode 112, and a separator 113 interposed between the first electrode 111 and the second electrode 112. The electrode assembly 110 may be formed by winding a stack of the first electrode 111, the separator 113, and the second electrode 112 in a jelly-roll form. The first electrode 111 may function as a positive electrode, and the second electrode 112 may function as a negative electrode. A first electrode tab 114 is connected to the cap assembly 130 in an upper portion of the electrode assembly 110, and a second electrode tab 115 is connected to a bottom plate 122 of the case 120 in a lower portion of the electrode assembly 110.

The first electrode 111 is formed by applying a first electrode active material such as a transition metal oxide on a first electrode collector formed of metal foil such as aluminum foil. A first electrode non-coating portion that is not coated with a first electrode active material is formed on the first electrode 111, and a first electrode tab 114 is attached to the first electrode non-coating portion. The first electrode tab 114 has one end, which is electrically connected to the first electrode 111, and the other end, which protrudes upward from the electrode assembly 110 and is electrically connected to the cap assembly 130.

The second electrode 112 is formed by applying a second electrode active material such as graphite or carbon on a second electrode collector made of metal foil such as copper or nickel. A second electrode non-coating portion that is not coated with a second electrode active material is formed on the second electrode 112, and a second electrode tab 115 is attached to the second electrode non-coating portion. The second electrode tab 115 has one end, which is electrically connected to the second electrode 112, and the other end, which protrudes downward from the electrode assembly 110 and is electrically connected to the bottom plate 122 of the case 120.

The separator 113 is disposed between the first electrode 111 and the second electrode 112 to prevent short circuit from occurring and allow lithium ions to be movable. The separator 113 may be formed of polyethylene, polypropylene, or a composite film of polyethylene and polypropylene.

The case 120 includes a side plate 121, which is a cylindrical body having a predetermined diameter to form a space in which the electrode assembly 110 is accommodated, and a bottom plate 122 that seals a lower portion of the side plate 121. An upper opening of the case 120 is opened to be sealed after inserting the electrode assembly 110. Also, a beading part 123 for preventing the electrode assembly 110 from flowing is formed at an upper portion of the case 120. Also, a crimping part 124 for fixing the cap assembly 130 and the gasket 190 is formed at the uppermost end of the case 120. The crimping part 124 has a gasket 170 interposed therein and is formed to press the cap assembly 130, thereby preventing the cap assembly 130 from being separated and preventing the electrolyte from leaking.

Figure 2:
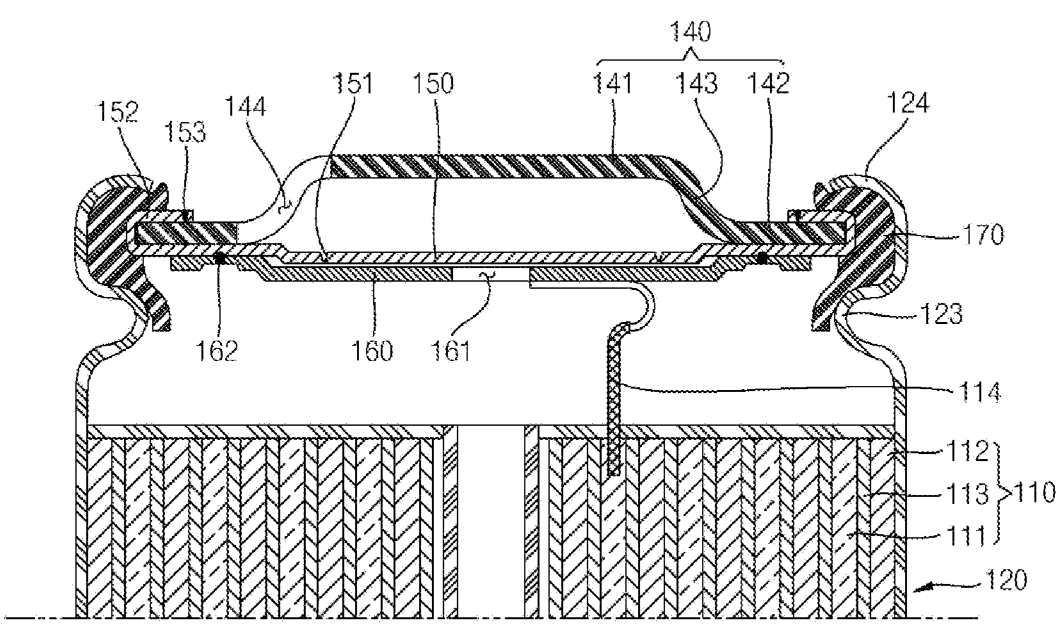
FIG. 2 is a cross-sectional view of a cap assembly in the secondary battery according to an embodiment of the present invention.
Figure 3:
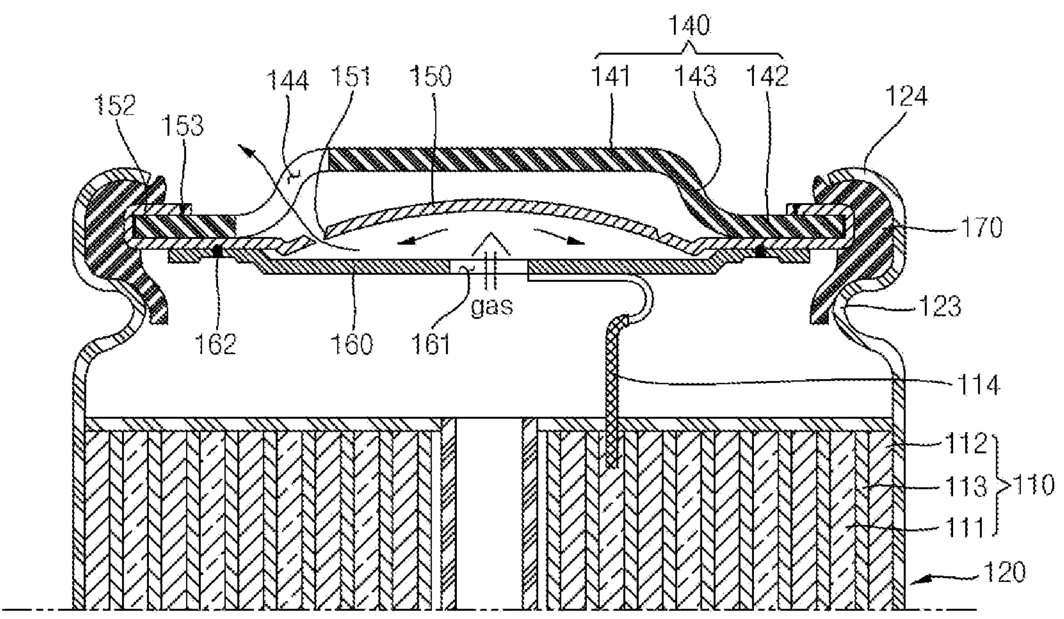
FIG. 3 is a cross-sectional view illustrating a state in which a safety vent of the cap assembly operates according to an embodiment of the present invention.

FIG. 2 is a cross-sectional view of the cap assembly in the secondary battery according to an embodiment of the present invention. FIG. 3 is a cross-sectional view illustrating a state in which a safety vent of the cap assembly operates according to an embodiment of the present invention.

Referring to FIG. 2, the cap assembly 130 includes a cap-up 140, a safety vent 150, and a cap-down 160.

The cap-up 140 is provided as a circular plate body and includes a terminal part 141 convexly formed at a center thereof, a coupling part 142 disposed on an outer circumference of the terminal part 141, and a connection part connecting the terminal part 141 and the coupling part 142 to each other. The terminal part 141 protrudes upward rather than the coupling part 142 to serve as a terminal electrically connected to an external circuit. The terminal part 141 is electrically connected to the first electrode tab 114 to function as, for example, a positive electrode. The coupling part 142 is disposed on the outer circumference of the terminal part 141, and the safety vent 150 is coupled to the coupling part 142. The connection part 143 connects the terminal part 141 and the coupling part 142 to each other, and a gas discharge hole 144 is formed in the connection part 143. The gas discharge hole 144 may be formed in plurality in the connection part 143 and provide a passage through which a gas generated inside the case 120 is discharged. Also, a portion of the gas discharge hole 144 may extend to the terminal part 141 and the coupling part 142.

The safety vent 150 is provided as a circular plate body corresponding to the cap-up 140 and is installed to be in close contact with the coupling part 142 at a lower portion of the cap-up 140. The safety vent 150 includes a notch 151 that is broken by an internal gas generated in the secondary battery 100. Also, an edge of the safety vent 150 surrounds the cup-up 140 to extend to an upper side of the cup-up 140. Here, the upward extending portion of the cap-up 140 is defined as a vent extension part 152. Furthermore, the vent extension part 152 includes a vent welded part 153. The vent welded part 153 may be formed by welding the vent extension part 152 and the coupling part 142 of the cap-up 140 through a laser. The vent welded part 153 may fix the safety vent 150 to the cap-up 140. In the safety vent 150, when an internal pressure of the case 120 is equal to or greater than an operation pressure of the safety vent 150, the notch 151 is broken while the safety vent 150 ascends upward by the gas discharged through the gas discharge hole 161 of the cap-down 160. Thus, the internal gas generated in the secondary battery 100 may be discharged through the gas discharge hole 144 of the cap-up 140 to prevent the secondary battery 100 from being exploded. The safety vent 150 may be made of aluminum (Al).

The cap-down 160 is provided as a circular plate body, and the gas discharge hole 161 is formed at a center of the cap-down 160. The gas discharge hole 161 serves to discharge the internal gas generated in the secondary battery 100. In addition, since only one gas discharge hole 161 is formed at the center, the internal gas generated from the secondary battery 100 may be concentrated into the center of the cap assembly 130 to facilitate the breakage of the safety vent 150. A first electrode tab 114 is welded to an outer circumference of the gas discharge hole 161 so that the cap-down 160 and the first electrode tab 114 are electrically connected to each other. Also, the first electrode tab 114 is directly welded to a bottom surface of the cap-down 160. In other words, in the related art, since the first electrode tab is in contact with a protrusion of the safety vent through a sub-plate, a contact area between the first electrode tab and the safety vent is relatively small, and thus, resistance between therebetween is large. However, in the present invention, since the first electrode tab 114 is in surface contact with the bottom surface of the cap-down 160, the contact area between the first electrode tab 114 and the safety vent 150 may be relatively large to reduce the resistance between the first electrode tab 114 and the safety vent 150. In addition, a welded part 162 is formed on an outer circumference of the cap-down 160. The welded part 162 may be formed by welding the cap-down 160 and the safety vent 150 through the laser. The welded part 162 may fix the cap-down 160 to the safety vent 150. The welded part 162 may be formed outside the notch 151 so that the safety vent 150 is easily broken by the internal gas generated in the secondary battery 100. In addition, since the cap-down 160 is fixed to the safety vent 150 by the welded part 162, and the first electrode tab 114 is welded to the bottom surface of the cap-down 160, the notch 151 of the safety vent 150 may be easily broken by the internal gas. In other words, as illustrated in FIG. 3, since the first electrode tab 114 is welded to the cap-down 160, the cap-down 160 may not ascend upward even if the internal gas is generated, and thus, the internal gas passing through the gas discharge hole 161 may push the safety vent 150 upward to easily break the notch 151. In addition, the internal gas passing through the notch 151 of the safety vent 150 may be discharged to the outside along the gas discharge hole 144 of the cap-up 140 to prevent the secondary battery 100 from being exploded.

In addition, since the cap-down 160 is welded to the safety vent 150 through the welded part 162, even if the notch 151 is broken by the internal gas, current flowing through the first electrode tab 114 continuously flows through the cap-down 160, the safety vent 150, and the cap-up 140. That is, in the related art, when the internal gas is generated, the current is primarily cut off, and then, when the gas is continuously generated, the safety vent secondarily operates to discharge the gas. However, the present invention relates to a system in which, when the internal gas is generated, the safety vent 150 immediately operates to quickly discharge the gas, thereby ending the abnormal situation. That is, in the secondary battery 100 according to the present invention, the cap-down 160 may be directly welded to the safety vent 150 and the first electrode tab 114, and thus, the safety vent 150 may stably operate, and the secondary battery 100 may be improved in safety.

As described above, in the present invention, the number of components of the cap assembly may be reduced to reduce costs, and when the internal gas is generated, the safety vent 150 may quickly 150 operate to quickly end the abnormal situation, thereby improving the safety.

The gasket 170 is installed in the upper opening of the case 120. That is, the gasket 170 is assembled by being in close contact with the outer circumferences of the cap-up 140, the safety vent 150, and the upper opening of the case 120. The gasket 170 may be made of a resin material such as polyethylene (PE), polypropylene (PP), polyethylene terephthalate (PET), or the like. The gasket 170 may electrically insulate the case 120 and the cap assembly 130 from each other.

Figure 4A:
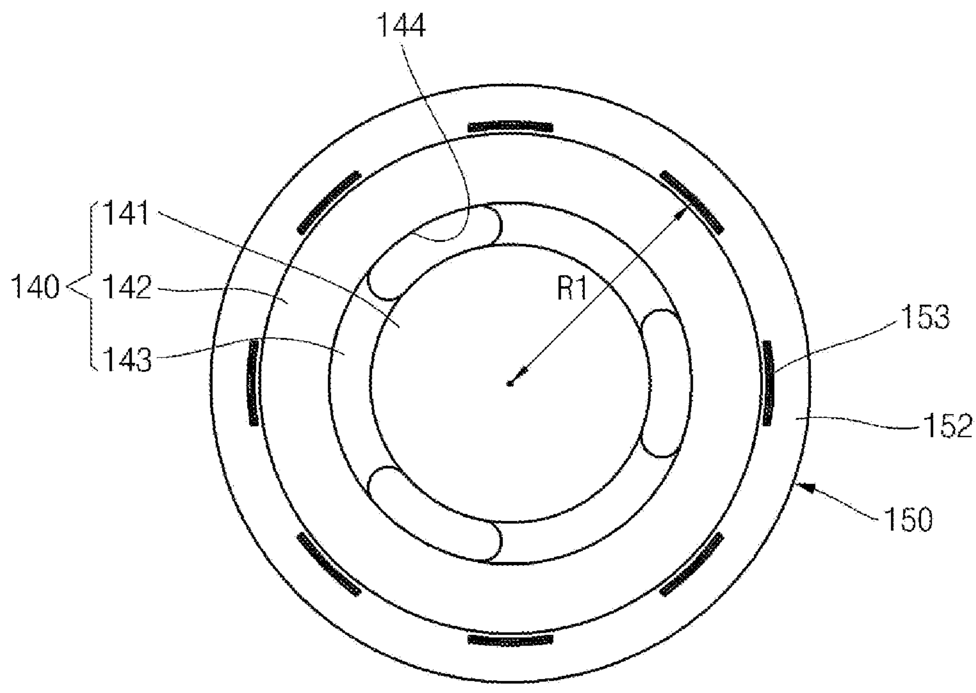
FIG. 4*b*** is a bottom view of the cap assembly according to an embodiment of the present invention.
Figure 4B:
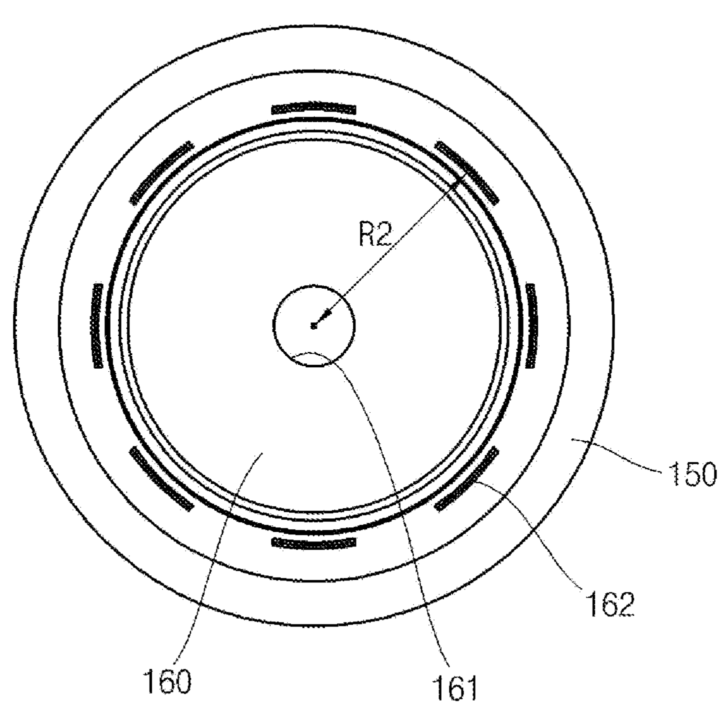
Figure 5A:
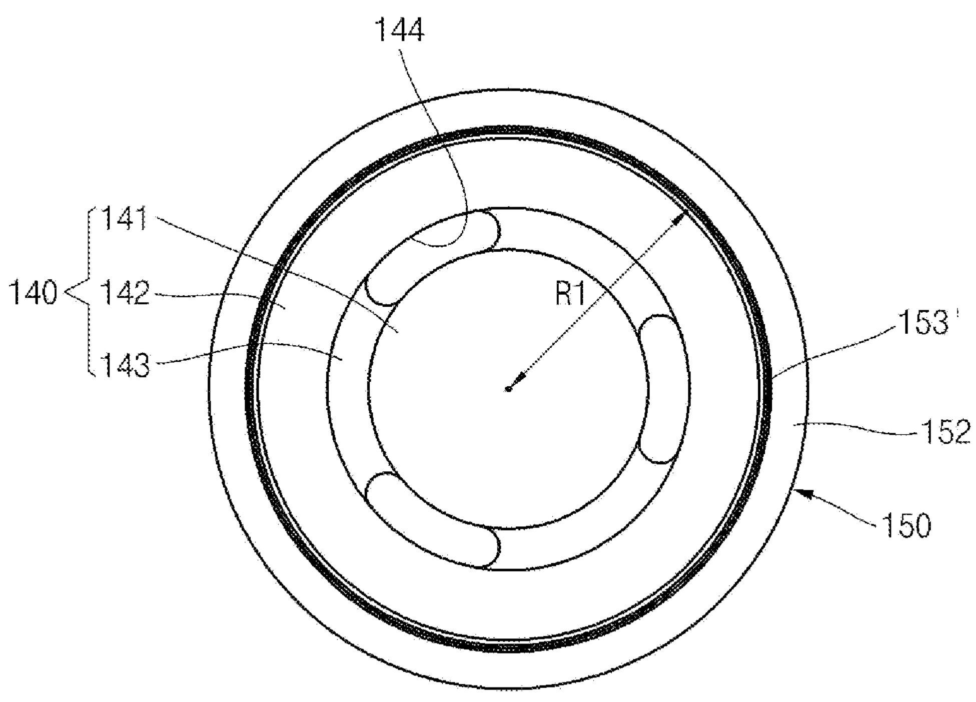
FIG. 5*b*** is a bottom view of the cap assembly according to another embodiment of the present invention.
Figure 5B:
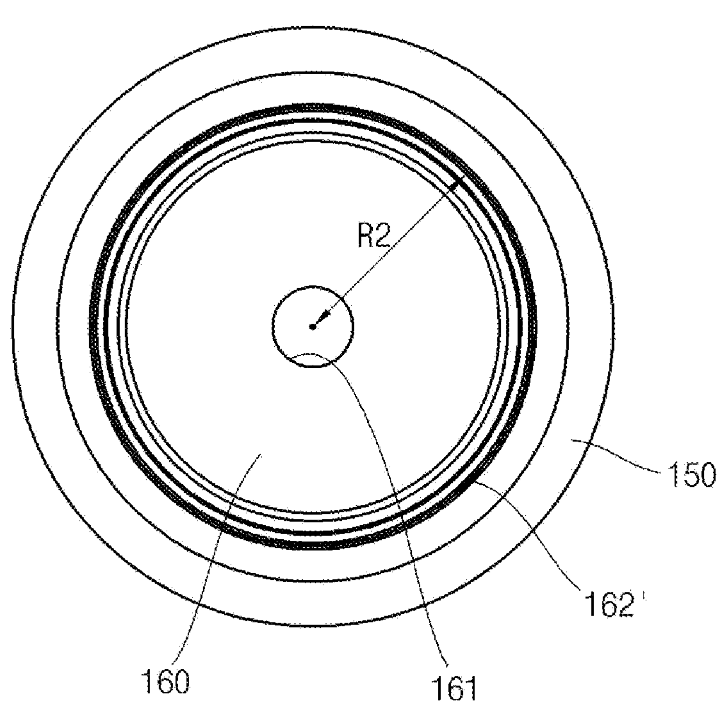

FIG. 4*a* is a plan view of the cap assembly according to an embodiment of the present invention, and FIG. 4*b* is a bottom view. FIG. 5*a* is a plan view of a cap assembly according to another embodiment of the present invention, and FIG. 5*b* is a bottom view.

Referring to FIG. 4*a*, a vent welded part 153 may be formed on a vent extension part 152 extending from a safety vent 150 to an upper side of a cap-up 140 to fix the safety vent 150 to the cap-up 140. The vent welded part 153 may be provided in plurality, which are spaced apart from each other, and each of the vent welded part 153 may have a first radius R1 from a center of a cap assembly 130. That is, the plurality of the vent welded parts 153 may be formed in an approximately arc shape. In other words, laser welding between the safety vent 150 and the cap-up 140 may be performed on several places. Also, as illustrated in FIG. 5*a*, a vent welded part 153' may be formed in a circular shape to surround the vent extension part 152. That is, the laser welding between the safety vent 150 and the cap-up 140 may be continuously performed so that the vent welded part 153' is formed as a single circle having a first radius R1. Thus, a contact area between the safety vent 150 and the cap-up 140 may increase to reduce internal resistance and heat generation.

Referring to FIG. 4*b*, the welded part 162 is formed on an outer circumference of the cap-down 160 and may fix a cap-down 160 to the safety vent 150. The welded part 162 may be provided in plurality, which are spaced apart from each other, and each of the vent welded part 153 may have a second radius R2 from the center of the cap assembly 130. That is, a plurality of the welded parts 162 may be formed in an approximately arc shape. In other words, the laser welding between the cap-down 160 and the safety vent 150 may be performed on several places. Also, as illustrated in FIG. 5*b*, a welded part 162' may be formed in a circular shape to surround the cap-down 160. That is, the laser welding between the cap-down 160 and the safety vent 150 may be continuously performed so that the welded part 162' is formed as a single circle having the second radius R2. Therefore, a contact area between the cap-down 160 and the safety vent 150 may increase to reduce internal resistance and heat generation.

The above-mentioned embodiment is merely an embodiment of the secondary battery, and thus, the present invention is not limited to the foregoing embodiment, and also it will be understood by those of ordinary skill in the art that various changes in form and details may be made therein without departing from the spirit and scope of the present invention as defined by the following claims.

The invention claimed is:

1. A secondary battery comprising:

an electrode assembly;

a case configured to accommodate the electrode assembly; and a cap assembly coupled to an upper portion of the case, the cap assembly comprising a cap-up, a safety vent installed on a lower portion of the cap-up and provided with a notch, and a cap-down coupled to a lower portion of the safety vent, wherein the cap-down comprises a welded part welded to the safety vent at a lower portion of the cap-down, and wherein the welded part extends along an outer circumferential portion of the cap-down.

2. The secondary battery of claim 1, wherein the welded part is provided in plurality, which have the same radius from the center of the cap assembly and are spaced apart from each other.

3. The secondary battery of claim 1, wherein the welded part has a circular shape formed continuously along an outer circumference of the cap-down.

4. The secondary battery of claim 1, wherein the welded part is formed outside the notch.

5. The secondary battery of claim 1, wherein a gas discharge hole through which a gas generated in the case is discharged is formed at a center of the cap-down.

6. The secondary battery of claim 5, wherein an electrode tab electrically connected to the electrode assembly is welded to the outside of the gas discharge hole.

7. The secondary battery of claim 1, wherein the safety vent comprises a vent extension part configured to surround an edge of the cap-up and extend to an upper side of the cap-up, and a vent welded part configured to weld the safety vent to the cap-up is formed on the vent extension part.

8. The secondary battery of claim 7, wherein the vent welded part is provided in plurality, which have the same radius from the center of the cap assembly and are spaced apart from each other.

9. The secondary battery of claim 7, wherein the vent welded part has a circular shape formed continuously along the outer circumferential portion of the vent extension part.

10. The secondary battery of claim 1, wherein, even though the notch is broken by a gas generated in the case, the cap-up, the safety vent, and the cap-down are electrically connected to each other.

* * * * *